(12) United States Patent
Pu

(10) Patent No.: US 10,967,868 B2
(45) Date of Patent: Apr. 6, 2021

(54) METHOD FOR DRIVING ASSISTANCE, IN ACCORDANCE WITH A SIGNAL SYSTEM

(71) Applicant: Continental Automotive GmbH, Hannover (DE)

(72) Inventor: Hongjun Pu, Solms (DE)

(73) Assignee: Continental Automotive GmbH, Hannover (DE)

( * ) Notice: Subject to any disclaimer, the term of this patent is extended or adjusted under 35 U.S.C. 154(b) by 570 days.

(21) Appl. No.: 15/519,039

(22) PCT Filed: Sep. 21, 2015

(86) PCT No.: PCT/EP2015/071544
§ 371 (c)(1),
(2) Date: Apr. 13, 2017

(87) PCT Pub. No.: WO2016/058784
PCT Pub. Date: Apr. 21, 2016

(65) Prior Publication Data
US 2017/0225687 A1    Aug. 10, 2017

(30) Foreign Application Priority Data
Oct. 15, 2014   (DE) .................. 10 2014 220 935.8

(51) Int. Cl.
*B60W 40/04*   (2006.01)
*B60W 50/00*   (2006.01)
(Continued)

(52) U.S. Cl.
CPC .......... *B60W 40/04* (2013.01); *B60W 30/143* (2013.01); *B60W 50/0097* (2013.01);
(Continued)

(58) Field of Classification Search
CPC .............. B60W 40/04; B60W 30/143; B60W 50/0097; G08G 1/07; G08G 1/096708;
(Continued)

(56) References Cited

U.S. PATENT DOCUMENTS

| 6,563,826 B1* | 5/2003 | Shikama | H04L 1/18 370/394 |
| 2015/0015421 A1* | 1/2015 | Krijger | G08G 1/0129 340/932 |
| 2015/0329107 A1* | 11/2015 | Meyer | G08G 1/095 701/28 |

FOREIGN PATENT DOCUMENTS

| CN | 101842819 A | 9/2010 |
| CN | 102097010 A | 6/2011 |

(Continued)

OTHER PUBLICATIONS

S. Durekovic and N. Smith, "Architectures of Map-Supported ADAS," 2011 IEEE Intelligent Vehicles Symposium (IV), Baden-Baden, 2011, pp. 207-211 (Year: 2011).*

(Continued)

*Primary Examiner* — Isaac G Smith

(57) ABSTRACT

The invention relates to a driving assistance method for a vehicle, wherein the movement of the vehicle in the direction of travel can be influenced in accordance with a traffic-controlling signal system positioned on the road in front of the vehicle and having cyclically recurring signal states, and wherein, inside the vehicle, first data relating to the position of a stop line associated with the signal system, and second data relating to the start times and end times of individual signal states of the signal system are determined via a first data processing system (electronic horizon) and (Continued)

provided in the form of data packets (messages) (A, B) for electronic control devices by means of a data connection inside the vehicle, and wherein individual data packets contain at least the following data: an earliest possible and/or latest possible time for the exchange of a signal phase, as well as a most probable time of the exchange of a signal phase. The corresponding data can be provided in a more efficient manner in the vehicle, in a predetermined bit length according to the ADASIS v2-protocol and optionally by means of a CAN-bus-transport protocol, in such a way that the electronic control devices can base the planning of driving assistance measures on same.

4 Claims, 5 Drawing Sheets

(51) Int. Cl.
  *B60W 30/14* (2006.01)
  *G08G 1/0967* (2006.01)
  *G08G 1/16* (2006.01)

(52) U.S. Cl.
  CPC . *G08G 1/096708* (2013.01); *G08G 1/096775* (2013.01); *G08G 1/163* (2013.01); *G08G 1/166* (2013.01); *G08G 1/167* (2013.01); *B60W 2555/60* (2020.02); *B60W 2720/10* (2013.01)

(58) Field of Classification Search
  CPC .. G08G 1/096775; G08G 1/163; G08G 1/166; G08G 1/167
  USPC .......................................... 701/117, 414, 446
  See application file for complete search history.

(56) References Cited

FOREIGN PATENT DOCUMENTS

| | | | |
|---|---|---|---|
| CN | 103245351 A | 8/2013 | |
| CN | 103383265 A | 11/2013 | |
| CN | 103909928 A | 7/2014 | |
| DE | 102008060869 A1 | 6/2009 | |
| DE | 102009042923 A1 | 8/2011 | |
| DE | 102010003249 A1 * | 9/2011 | ............ G01C 21/26 |
| DE | 102010027899 A1 | 10/2011 | |
| DE | 102011077656 A1 | 12/2012 | |
| DE | 102012219922 A1 | 5/2013 | |
| DE | 112012001799 T5 | 1/2014 | |
| EP | 2610782 A1 | 7/2013 | |
| KR | 2011065300 A * | 6/2011 | |
| WO | 2009027173 A1 | 3/2009 | |
| WO | 2011117141 A1 | 9/2011 | |

OTHER PUBLICATIONS

International Search Report and Written Opinion dated Dec. 17, 2015 from corresponding International Patent Application No. PCT/EP2015/071544.

* cited by examiner

METHOD FOR DRIVING ASSISTANCE, IN ACCORDANCE WITH A SIGNAL SYSTEM

BACKGROUND

The invention lies in the field of electrical engineering and can be used particularly advantageously in automotive engineering. It specifically relates to a driving assistance method in a vehicle.

Driving assistance systems for vehicles have been discussed and also implemented for a long time in automotive engineering. Early examples of such assistance systems are, for example, braking aids and autonomous braking systems. Such systems may support or partially replace the driver's perception by means of sensors, on the one hand, and/or may support the implementation of intended actions by the driver, on the other hand. With advancing technology, more and more complex functions can be increasingly undertaken by automatic systems during the driving of a vehicle and the state of current technological development in this field is reflected in the practice of calling current systems "ADAS"=advanced driving assistant systems.

Such advanced assistance systems obtain data from the so-called electronic horizon, that is to say a unit and a method in the vehicle which in various ways provides the driver and particular assistance devices in the vehicle with information which is as comprehensive as possible and is not available or is not yet available at a particular time without the aid of the electronic horizon solely on the basis of the perception or sensor system. For example, the system may use sensors which have a higher sensitivity than the human perception system, but, on the other hand, information relating to road sections ahead in the direction of travel may also be requested by third parties or taken from a database. A modern electronic horizon therefore usually has database information which assigns a number of attributes, that is to say properties relevant to driving, to the road sections ahead in the direction of travel.

In this manner, the electronic horizon can signal, for example, that a future route which is currently not yet visible has a particular incline or a particular gradient. The electronic horizon can transmit this information inside a vehicle to electronic control devices of the assistance devices which can plan the driving of the vehicle in an anticipatory manner. In this manner, an electronic horizon, together with corresponding planning methods, allows comfortable, anticipatory, energy-saving, possibly time-saving, but particularly safe driving in any case.

In order to make information from an electronic horizon device available to control devices via a data connection inside a vehicle, standardized reporting methods and mechanisms have been developed, a few of which have been discussed at the ADASIS forum and have been stipulated in the so-called ADASIS protocol. Version 2 of the ADASIS protocol is specialized in the anticipatory assessment of a particularly likely future route, with the result that information specifically selected for this most likely route can be made available. It is possible for information relating to particular singular phenomena on the route (for example a bridge, a driving ban, a tunnel entrance) or particular road properties along the route to be reported in the form of a profile using particular standard messages via the electronic horizon and the corresponding communication means in the motor vehicle. Electronic control devices in the vehicle are set up for the type of these messages.

A disadvantage of the existing protocol solutions is that only static phenomena have hitherto usually been included in the messages.

Although WO 2011/117141 has already in principle disclosed the idea of also providing at least one control unit of the vehicle with dynamic variables via an electronic horizon, the practice of integrating dynamic phenomena, for example in the form of traffic lights, in the electronic horizon is also discussed there.

However, no specific way of being able to take into account the temporal conditions in the case of temporally variable phenomena on the route or on the most likely future route using the known protocols has hitherto been shown.

BRIEF SUMMARY

Therefore, the present invention is based on the object of providing a driving assistance system and method which can be used to represent a dynamic process in the most favorable manner possible by means of signals in the vehicle, in particular in an electronic horizon. In this case, the system is intended to be provided both with the information relating to the location at which the corresponding phenomenon occurs and with the information relating to the rules according to which signal changes can be expected in future. Finally, the corresponding information is intended to be able to be used by electronic control units in the vehicle as reliably and usefully as possible, possibly also in a versatile manner.

In order to achieve the object, the present invention relates to a driving assistance method in a vehicle, in which the movement of the vehicle in the direction of travel can be influenced on the basis of at least one traffic-controlling signal system which is in front of the vehicle on the road and has cyclically recurring signal states, and in which first data relating to the position of (a) stop line(s) assigned to the signal system(s) and second data relating to the start times and/or end times of individual signal states of the signal system(s) are determined inside the vehicle by means of a first data processing system (electronic horizon) and are provided for electronic control devices in the form of data packets (messages) by means of a data connection inside the vehicle, individual packets of the data packets containing at least the following data:

an earliest possible and/or a latest possible time for the change of a signal phase, and a most likely time of the change of a signal phase.

In principle, it is known practice, in driving assistance methods, to influence the movement of the vehicle in the longitudinal direction, that is to say in the direction of travel, by means of electronic control devices. Systems for controlling the speed, for controlling the gear ratio (gears) of the transmission and for selecting the type of drive in hybrid vehicles, in particular also for managing the recuperation of energy, are known, for example, for this purpose. Such systems may be used, on the one hand, to minimize the energy consumed and to optimize the speed profile, but they may also optimize the driving comfort and safety. It is also known practice (cf. the cited WO document), in principle, to include data from a signal system, in particular a light signal system (traffic lights), in the control. However, no specific implementation of such a structure in an electronic horizon has hitherto been known.

According to the present invention, the data, for example the position of the stop line at which the vehicle must presumably stop in the case of a corresponding signal of the signal system and the phase angle and frequency of the signal system, may be electronically coded and provided, for example, via a CAN bus which is conventional in the automotive sector. The data/information relating to an earliest possible or a latest possible time for the change of the signal phase and for the most likely time of the change of the signal phase have turned out to be particularly important in this case. This information can also be represented, for example, in such a manner that the most likely time of a change of the signal phase is indicated as well as a possible deviation from this with respect to an earlier and/or later changeover. The speed profile can therefore be optimized without the need for full braking upon reaching the signal system or maximum acceleration shortly before the signal system is reached if the signal system changes over at the earliest possible time or at the latest possible time.

The position of the stop line and the time indications mentioned can be transmitted in the form of an offset (=distance) from a known starting position and (with regard to the time indications) according to an absolute time indication on the basis of a system time, for example GPS time.

The data may be directly transmitted to the vehicle or to the first data processing system by the signal system. However, the data may also be first of all transmitted by the signal system to a central stationary data processing system and may be provided there together with other data for vehicles.

Finally, the data may also be directly made available by the signal system to a non-localized data processing system in the form of a cloud, with the result that the data can then also be forwarded from vehicle to vehicle. Inside a vehicle, these data can then also be first of all compared with other data relating to the driving environment of the respective vehicle, for example relating to route inclines or the surface condition of the road, on the electronic horizon, that is to say in the region of the first data processing system. For example, the surface condition, together with the incline or the gradient of the route, decides on possible accelerations and braking operations. The decision made by the electronic control device on the basis of the data received from the electronic horizon influences the driving behavior of the vehicle and can possibly also be reported to other vehicles or to a central database. A message to the signal system itself is also conceivable. In this case, the signal system can also adapt its phase and/or its rhythm to one or more vehicles. the signal system itself is also conceivable. In this case, the signal system can also adapt its phase and/or its rhythm to one or more vehicles.

For the case of dynamic regulation of the signal system, one advantageous configuration of the invention provides for at least two data packets (messages) to be provided by the first data processing system, the first data packet containing an item of information stating that a second data packet connected to the first data packet is available.

For signal systems, for example traffic lights, which do not have a fixed switching frequency, but rather dynamically adapt to the volume of traffic, control is complicated in so far as a fixed control time cannot be expected. In this case, by accordingly identifying the messages/data packets during communication between the electronic horizon and an electronic control device inside the vehicle, it is possible to communicate that two messages/data packets which are connected are being transmitted. The two data packets are usually transmitted in succession, but they may also overlap in terms of time on account of the packet-oriented communication.

In the case of two data packets which are connected to one another, provision may be advantageously made for the first data packet to respectively contain an item of information stating that it is part of a pair of data packets and a second item of information stating that it is the first of the two data packets.

If the signal system is not controlled dynamically, a single message suffices and this message also contains the information stating that no further message follows.

Provision may be advantageously made for the second data packet to contain information relating to the most likely time of a future signal state change.

Provision is also advantageously made for the second data packet to contain information relating to an earliest possible and/or a latest possible time of a future signal state change.

The first data packet may contain the information relating to when the start of the next free-running phase of the signal system begins, for example in an absolute time indication on the basis of a time base which applies in the vehicle. The first data packet may also contain an item of information relating to how long a free-running phase lasts as standard and advantageously additionally how long a non-free-running phase lasts as standard.

A free-running phase can be understood as meaning, for example, the green phase of traffic lights, whereas the non-free-running phase is understood as meaning the sum of the amber phase and the red phase, that is to say the entire period in which the signal system should/must not be driven through according to the applicable rules.

One advantageous configuration of the invention also provides for the second data packet to contain an item of information relating to the earliest possible time of the beginning of a free-running phase (green phase) of the signal system, an item of information relating to the latest possible end of the same free-running phase and at least one item of information relating to a most likely time of the beginning and/or the end of the free-running phase.

In order to make it possible for the electronic control device to be informed of which of the two data packets is the first data packet and which is the second data packet, the first data packet not only usually contains an indication that it is connected to a second data packet, but also the second data packet contains an indication that it is the second data packet of a pair of data packets.

This can be effected, for example within the scope of an ADASIS standard, by virtue of the fact that both data packets belong to the same message type, but different profile types are stated and the content part of the first data packet contains a status bit indicating whether the signal system operates according to fixed timing or dynamic timing.

For the case of a signal system with a firmly predefined timing scheme, another advantageous configuration of the invention may provide for a data packet to contain information relating to the current signal state, the earliest possible time for changing over the signal state and the interval between the earliest possible time for changing over the signal state and the latest possible time for changing over the signal state.

In this case, a dynamic behavior of the signal system, that is to say the extension of individual signal phases depending on the volume of traffic, need not be expected. However, uncertainties as a result of the vagueness of the behavior of the signal system itself or as a result of inaccuracy of the recorded parameters of the signal system or inaccuracy when determining the position of the motor vehicle can nevertheless be expected. On the basis of these uncertainties, it is advantageous to transmit an earliest possible time for changing over the signal state and the duration of the next signal state and to take them into account when creating a plan for the vehicle.

The method variants mentioned may be coded in a particularly simple manner by means of transmission according to the ADASIS v2 standard inside a vehicle equipped with an electronic horizon.

Inside a vehicle, communication between the electronic horizone and the electronic control devices can be transmitted in a particularly simple manner using a digital data bus, in particular a CAN bus.

BRIEF DESCRIPTION OF THE DRAWINGS

The invention is shown and explained below using examples on the basis of figures of a drawing, in which.

DETAILED DESCRIPTION

Figure 1:
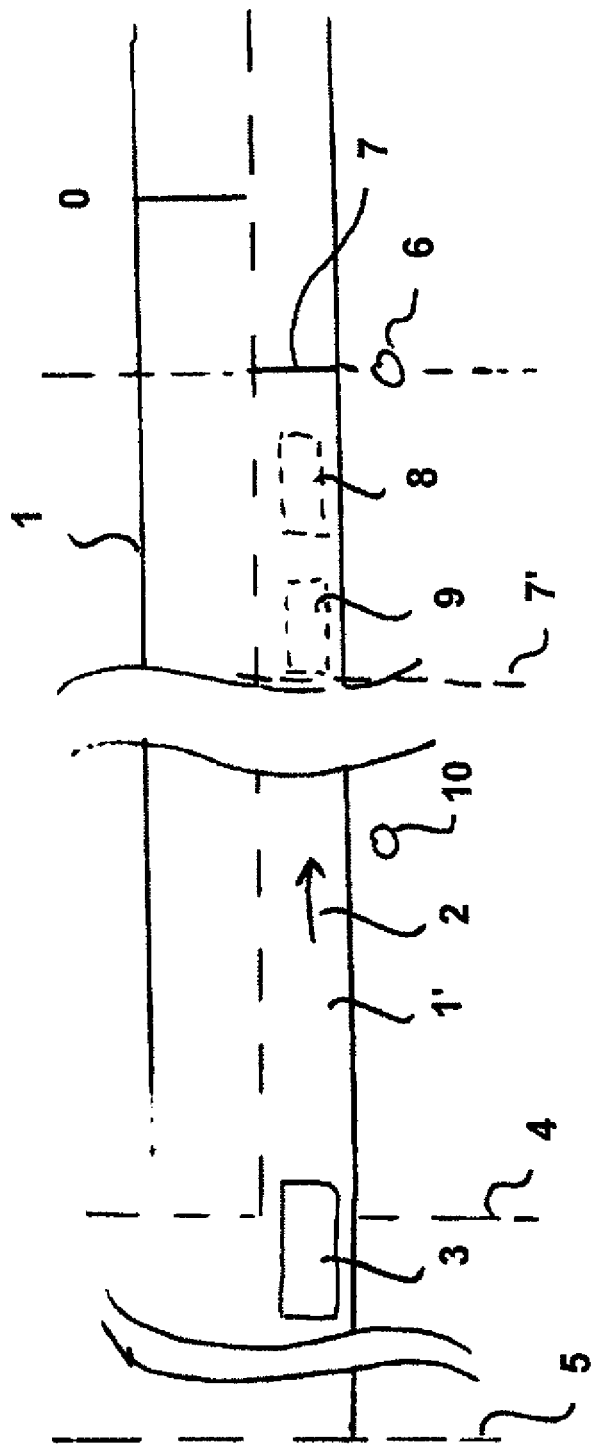
FIG. 1 schematically shows the illustration of a route from above with a vehicle and a signal system, FIG. 2 schematically shows a route with possible junctions, FIG. 3 schematically shows a vehicle having a data processing device for an electronic horizon and a signal system which is connected to the vehicle by means of a radio connection.

FIG. 1 shows, as seen from above, a road 1 having a lane 1' which is driven along by vehicles in the direction of the arrow 2. The vehicle having a driving assistance device is designated using 3 and is situated at the position 4. The position 4 is determined by the distance (=offset) from the zero line 5.

A signal system 6 in the form of traffic lights is arranged on the lane 1'. This signal system is assigned a stop line 7 at which the vehicle 3 usually stops when the signal system signals red or amber or signals another stop signal, whereas the vehicle 3 can cross the stop line 7 when the signal system 6 signals the free-running signal or green.

The position of the stop line is likewise represented as an offset, calculated from the zero line 5, in the system. The stop line 7 may also be moved by the system behind the last vehicle 9 in a row of vehicles 8, 9 forming a traffic jam in front of the stop line 7 of the signal system 6.

A traffic sign 10 is likewise depicted on the lane 1' and must be heeded, that is to say must also be concomitantly included in the planning of the journey by the driving assistance system, when it signals a maximum speed, for example.

Figure 2:
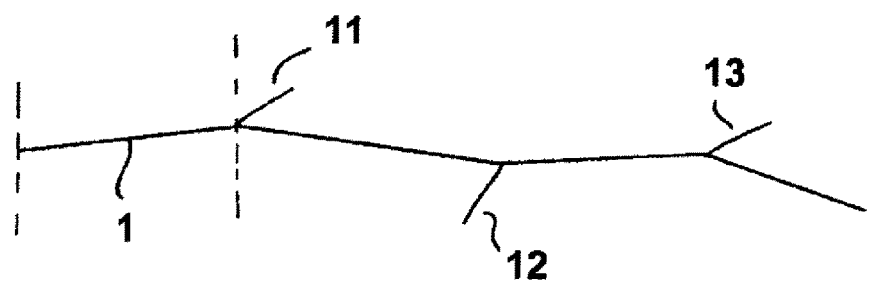

Whereas only the most likely route (most probable path) is linearly illustrated in FIG. 1, FIG. 2 illustrates a route 1 with possible turn-offs 11, 12, 13. If, at the beginning of the journey or at a time before passing a junction 11, 12, 13, a road which leaves the route 1 at one of the junctions 11, 12, 13 is selected by the system or is signaled to the system by the driver, a new path with its own identity and also its own designation in the system begins at the respective junction, with the result that different roads can be distinguished in the system.

Figure 3:
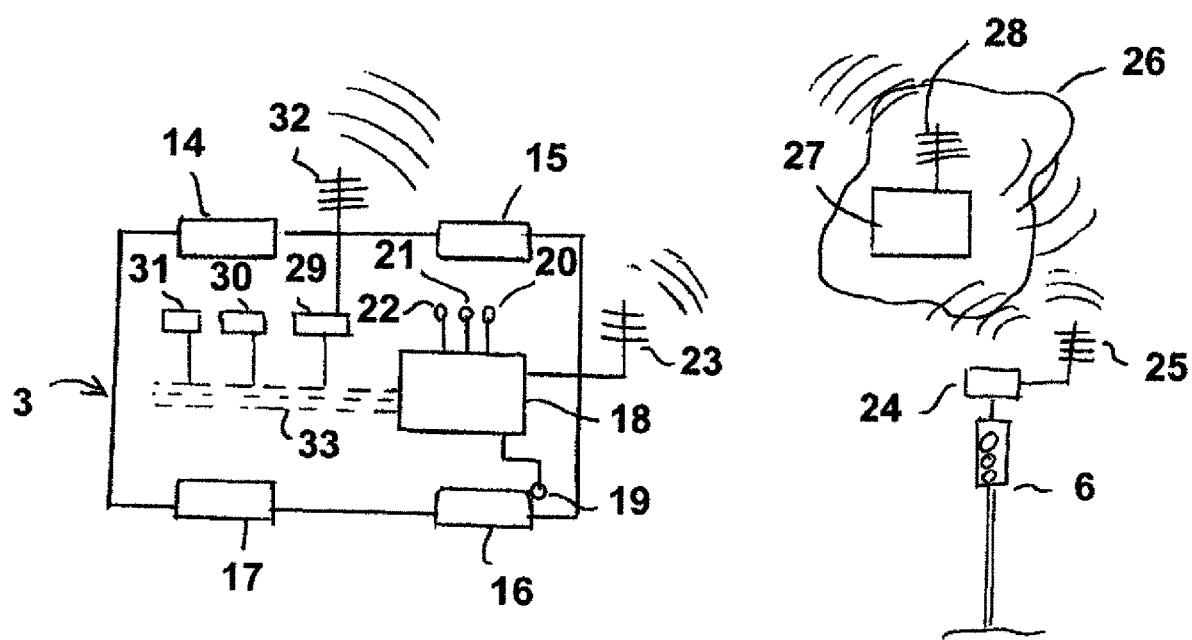

FIG. 3 schematically shows the structure of a driving assistance system having various components. The vehicle is first of all schematically illustrated and designated using 3, four wheels 14, 15, 16, 17 being schematically depicted for the purpose of illustration.

The vehicle 3 has a first data processing system (electronic horizon) 18 which is in the form of a microcomputer or a microcontroller and is equipped with or connected to various sensors 19, 20, 21, 22. 19 can be used to designate a roll sensor, for example, and a gyro sensor or else a plurality of gyro sensors or a speed sensor and further sensors may also be provided.

The electronic horizon 18 is also connected to external components via an antenna 23. For example, there may be a direct radio connection to a signal system 6 via a transceiver 24 and an antenna 25 of the signal system 6. However, this radio connection may also be established using an additional component 26, this component 26 either being able to contain a stationary server 27 with an antenna 28 and/or being in the form of a cloud with a multiplicity of intelligent units which are connected to one another in a communication network.

The first data processing system 18 can receive, from the signal system 6, information relating to its current signal state and the length of individual signal intervals and/or the temporal position of the next changeover time measured in an absolute time base. This information can be assigned to an absolute time with the aid of an absolute time base in the vehicle which can be oriented, for example, to a GPS time or to another normal time. This means that any delays during the signal transmission can cause virtually no errors with respect to the time indications.

Therefore, in conjunction with a position sensor which determines the current position of the vehicle 3, for example via a satellite signal receiver, the data processing system 18 can provide information relating to the appearance of the future road and at which times the vehicle may be at which location. The driver or further units in the vehicle can therefore be provided with a so-called electronic horizon having additional attributes relating to the future route, the additional attributes going beyond the pure description of the route and being able to provide, for example, information relating to route inclines, transverse gradients and the road condition as well as speed restrictions and possibly special singularities of the route. Therefore, these data provided by the electronic horizon can be used by various electronic control units 29, 30, 31 in the vehicle to preplan the longitudinal movement of the vehicle 3. If, for example, the position of the vehicle and the position of the stop line 7 of a signal system 6 as well as the switching scheme of the signal system are known, the control device 29 inside the vehicle 3 can select a "green wave" speed at which the vehicle can cross the stop line 7 during a green phase without further braking operations or accelerations.

Such a speed can also be immediately reported to other road users or to the signal system 6 by the control unit 29 by means of the radio connection and the antenna 32.

The control device 29 can plan the speed of the vehicle, for example, and can influence the acceleration and braking and, in a hybrid vehicle, can also control the recuperation behavior for example, can control or influence a gear change/transmission gear ratio or all other variables associated with the longitudinal movement of the vehicle. This is particularly useful in the case of automated driving.

So that the electronic control devices 29, 30, 31, which are connected to the electronic horizon 18 by means of a digital data bus 33 in the form of a CAN bus, can process the data in an optimum manner, these data are disseminated in the vehicle via the CAN bus 33 in a special digital form of presentation according to the ADASIS v2 protocol. In terms of its structure, the ADASIS v2 protocol is particularly suitable for describing a linear most likely future route with possible junctions as well as the special features which occur within the scope of such a linear route. Therefore, the volume of data to be processed and transmitted is considerably reduced in comparison with an older version of the standard which is rather area-oriented and reflects data relating to a territory. of presentation according to the ADASIS v2 protocol. In terms of its structure, the ADASIS v2 protocol is particularly suitable for describing a linear most likely future route with possible junctions as well as the special features which occur within the scope of such a linear route. Therefore, the volume of data to be processed and transmitted is considerably reduced in comparison with an older version of the standard which is rather area-oriented and reflects data relating to a territory.

The ADASIS v2 protocol defines various messages/data packets (=messages) each signaling particular special features of the future route. In addition, message types in the form of a profile message which can be used most easily to communicate change profiles of particular attributes relating to the route are also permissible.

Within the scope of the present invention, a description is given of messages which describe the position and the temporal behavior of signal systems, in particular traffic lights, in a form which is as efficient as possible.

In this context, the intention is first of all to describe the message which describes the state in which the position of the signal system and the current signal state and approximately the time to the next changeover are known. Optionally, an estimation of the period for which an individual switching state normally lasts can also be concomitantly represented.

Figure 4:
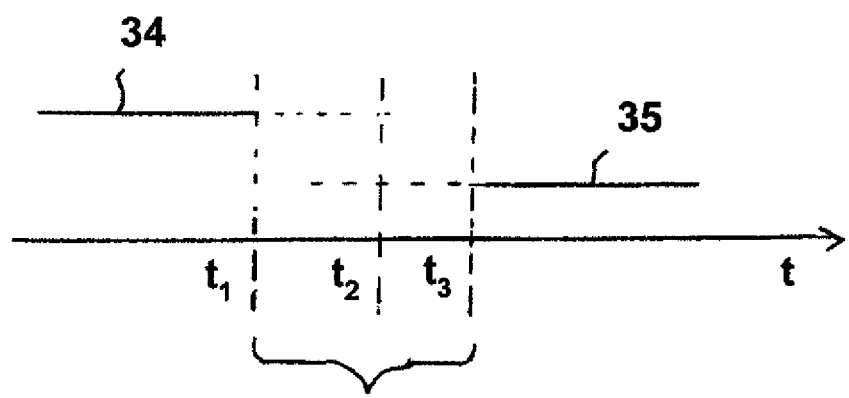
FIG. 4 shows a timing scheme of a signal system, the time of the next changeover being only approximately known.

In this respect, FIG. 4 horizontally illustrates the course of the time t in a diagram, in which case particular signal states are represented by solid or dashed horizontal lines.

The line 34 shows a signal state of the signal system which is green at the detection time and signifies the free-running signal. Within the scope of the message, it is certain that this signal state 34 will last until the time t1. t1 is therefore the earliest changeover time (minTimeToChange). The time t3 is the latest time of the signal change (maxTimeToChange), the new signal state being designated using 35 (red =stopping). t2 is used to designate a most likely time of a change of the signal state. This state illustrated in FIG. 4 can be represented in digital form in a message, the message corresponding to a data packet having 64 bits according to a protocol. Stipulated sections of the protocol signal, for example, the message type (type=5 in the present case), the profile type (=16 in the present case), the number of repeated transmissions (=1 in the present case, that is to say 0th repetition), the number of the path on which the signal system is arranged and the offset, that is to say the position of the stop line of the signal system as a distance from the zero line 5 according to FIG. 1. In addition, information relating to the current signal state (CurrentColor length=3 bits), the minimum time to the signal change (minTimeToChange, 10 bits) and the interval time between the earliest date and the latest date of the signal change (length of 5 bits) and the time of the most likely signal change (length of 5 bits) is included for the signal state of the signal system. In addition, an item of information relating to the reliability (confidence) of the message with a bit length of 4 bits and the determined recommended speed which results in the stop line being crossed during green (GreenWaveSpeed, 5 bits) is provided. The last-mentioned information relating to the speed of the green wave is optional and is possibly also provided by the operator of the light signal system or the traffic management system. However, it may also be determined by the electronic horizon or a downstream unit in the vehicle.

The more detailed division of the information units inside a message within the scope of the protocol can be gathered from table 1 at the end of the text.

Figure 5:
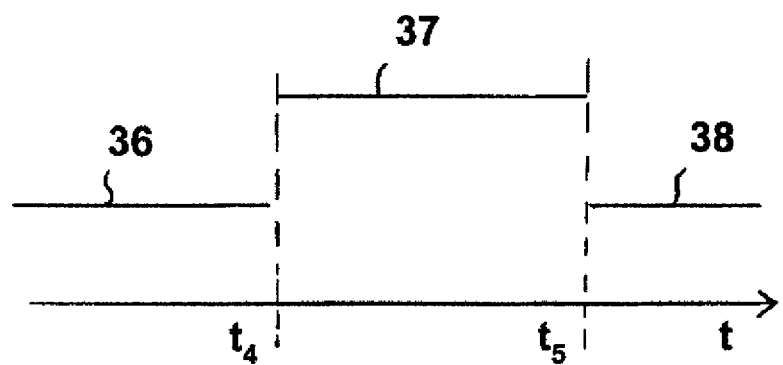
FIG. 5 shows a timing scheme of a signal system with fixed signal change times.
Figure 6:
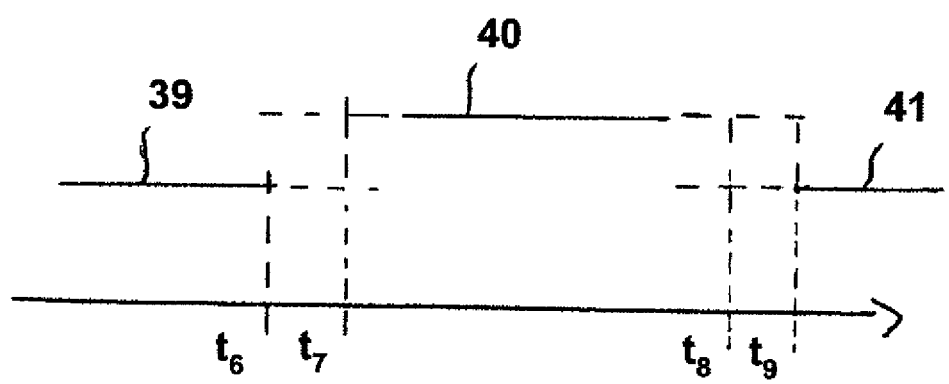
FIG. 6 shows a timing scheme of a signal system which can dynamically change its signal change times.

The second case to be considered by reference to FIGS. 5 and 6 relates to the fact that the signal phases of the signal system are known to the data processing device in the vehicle. This means that the duration of the individual phases (free-running phase and stopping phase, green phase and non-green phase) is known. However, it is assumed that the signal system can dynamically react to the present volume of traffic by extending one phase at the expense of another phase.

The currently applicable variables which are illustrated in FIGS. 4 to 6 may be transmitted as information relating to the signal system by means of direct communication between the vehicle and the signal system itself or via a backend server.

FIG. 5 illustrates the case in which the signal system switches at unchanged times. In this case, a red phase, for example, is designated using 36 in FIG. 5. It lasts until the time t4. A changeover to the green phase (free-running phase) 37 takes place at the time t4. This lasts for a time $t_5$ minus $t_4$ to the time t5. At the time t5, the signal system switches to red again in the switching state 38. For the sake of simplicity, a possible amber phase is concomitantly considered here as part of the stopping phase in the red line section.

The corresponding message can be gathered from the structure according to the first part of table 2 at the end of the text. A section of the message which designates the type of message (here: 5) and a profile type (here: 17 or 18) is provided. An item of information relating to the consecutive transmission number (CyclicCount) is also provided.

The message also contains the identity of the route on which the stop line of the signal system is provided and an offset (=distance) of the stop line from the zero line.

The dynamic behavior of the signal system is described by a first item of information (Control Status, 1 bit) relating to the behavior of the signal system, namely fixed timing of the changeover times (0), on the one hand, or dynamic timing (1), on the other hand. The message also contains the information relating to when the next free-running phase begins (17 bits, absolute time base). A section of 7 bits which describes the duration of the green phase and a further section with a length of 7 bits which describes the duration of the non-green phase (=stopping phase) are also provided.

If the signal system is a signal system which does not master dynamic regulation or is currently operated with fixed timing of the switching phases, it is communicated inside the message that the signal system does not have dynamic operation (Control Status=0) and the corresponding message is provided without there being a further message for this.

If the first message contains an item of information stating that the signal system follows dynamic operation, the first message is coded accordingly (Control Status=1) and a second message which is described below follows: the second message contains the designation of a message type (type=5 in the present case), a profile type (=18 in the present case, in contrast with that of the first message), the consecutive number of the message, the designation of the route on which the stop line of the signal system lies and the offset of the stop line. Optionally, instead of the offset of the stop line, the second message can state the offset of a possible tailback in front of the stop line if the tailback information is known in the vehicle. The message also contains information relating to the most likely start time of the next green phase (7 bits), the most likely end time of the next green phase (7 bits), the earliest possible time of the next green phase (7 bits) and the latest possible time of the end of the next green phase. The message may additionally also contain an optional item of text information.

Figure 7:
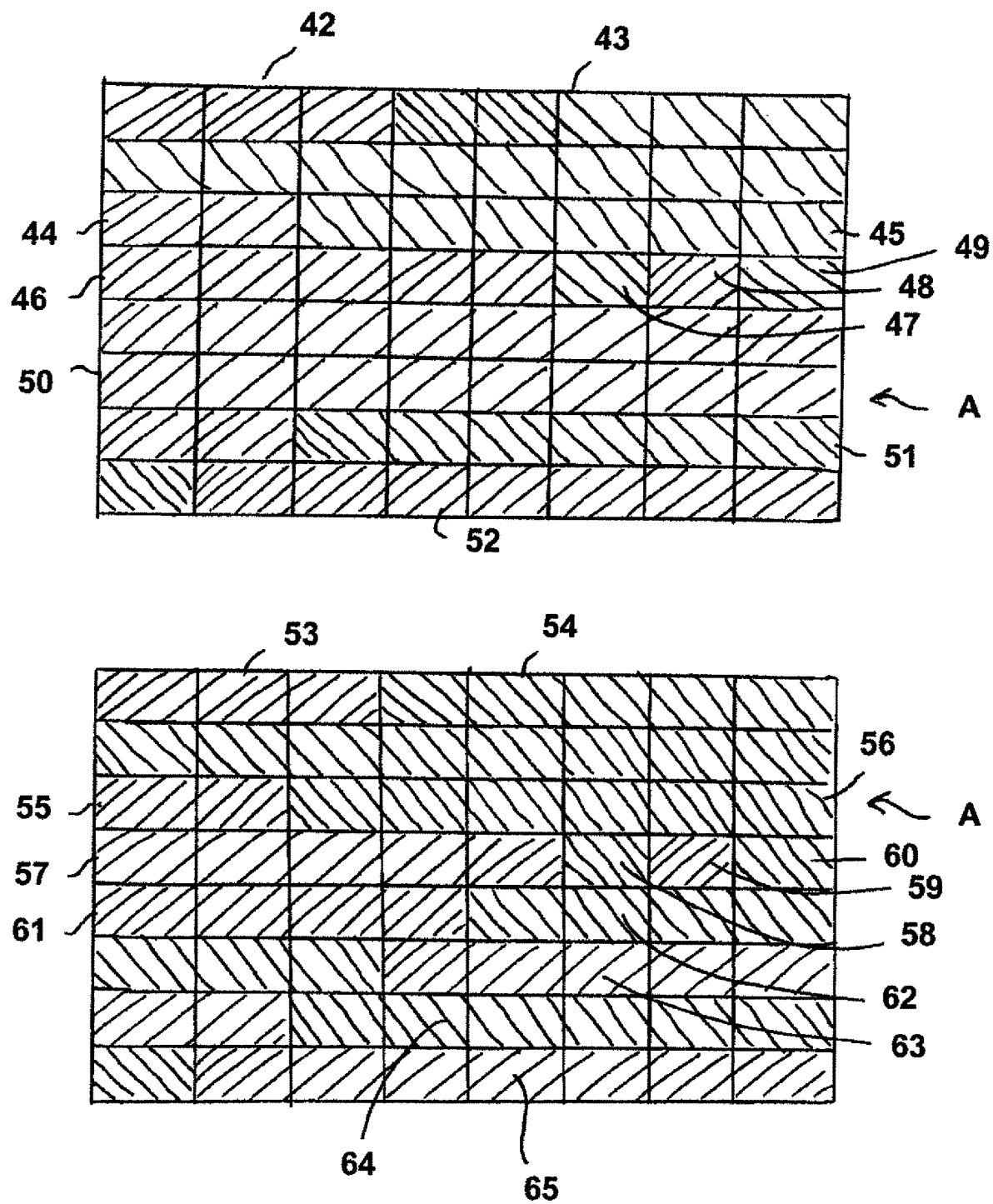
FIG. 7 shows the representation of two connected data packets which are provided via a CAN bus inside a vehicle.

FIG. 7 illustrates a possible representation of the digital contents of the two successive and connected messages described last. In this case, A is used to describe the first message and B is used to describe the second message. According to one configuration of the CAN bus, an individual message contains a bit pattern of 64 bits. The pattern according to which the 64 bits are transmitted allows different transmission sequences. This shall not be discussed in any more detail here. A structure and sequence of the corresponding digital variables are illustrated only by way of example. In this case, the sequence of the bits should be read horizontally, beginning from the top left to the right, and then should be read line by line from left to right. In the event of a change from a first represented variable to a second variable, the hatching respectively changes. Accordingly, the first message A begins with a unit 42 which has a length of 3 bits and designates the message type. This is followed by a unit which has a length of 13 bits and describes the offset/position of the stop line. This is followed by a unit 44 which has a length of 2 bits and represents the numbering (cyclic count) of the message. This is followed by a fourth unit 45 which has a length of 6 bits and describes the identity of the considered road (path index) on which the stop line is situated. This is followed by a fifth unit 46 which has a length of 5 bits and describes a profile type. This is followed by a sixth unit 47 which contains a control bit, a seventh unit 48 and an eighth unit 49 which contains an item of information relating to the updating of the message.

This is followed by a unit 50 which has a length of 18 bits and designates the start time of the next green phase (Next Start Green). This is followed by a unit 51 which has a length of 7 bits and describes the length of the green phase (GreenPhase) and is followed by a further unit 52 which has a length of 7 bits and describes the duration of the red/amber phase (non-green phase) (NoGreenPhase).

In the case in which a second message follows the first message because dynamic regulation of the light signal system is possible, this second message according to FIG. 6 first of all contains an item of information relating to the time t6 of the earliest possible start of the green phase and an item of information relating to the time t7 of the most likely start of the green phase 40. In FIG. 6, the red phase is designated using 39, the following green phase is designated using 40 and the red phase following the latter is designated using 41.

The message also contains information relating to the latest possible change from the green phase 40 to the red phase 41, which is designated using t9, and information relating to the time of the most likely change between the green phase 40 and the red phase 41, which is designated using t8. 7 bits are respectively provided in the message for the corresponding times. The structure of the message can be gathered in more detail from the second part of table 2.

FIG. 7 again contains a representation of the corresponding information in a message according to the specifications of the CAN bus. There, a unit having a length of 3 bits and relating to the type of message is provided using 53 and is followed by a unit 54 which has a length of 13 bits and describes the position of the stop line or the end of the traffic jam. A unit 55 having a length of 2 bits for designating the consecutive numbering of the message (cyclic count) is provided next. This is followed by a unit 56 (path index) which identifies the route on which the stop line lies. This is followed by a unit 57 which has a length of 5 bits and designates a profile type. This is followed by the units 58, 59, 60 which each have a length of 1 bit and contain control bits or 1 bit indicating the number of repetitions during the transmission of the corresponding message or the updating of the message. These are followed by the unit 61 which has a length of 4 bits and may contain an additional item of text information. This is followed by the unit 62 which designates the most likely time of the start of the green phase and is followed by the unit 63 which designates the most likely time of the end of the green phase. 64 is used to designate a unit which has a length of 7 bits and designates the earliest time of the start of the green phase and is followed by a final unit 65 which has a length of 7 bits and designates the last possible time of the end of the green phase.

In the form described and illustrated, the signal state and the behavior of a signal system on a future road can be efficiently represented by an electronic horizon or a corresponding data processing system in a vehicle in such a manner that electronic control units in the vehicle can base planning of driving assistance measures on this in an optimum manner.

Figure 8:
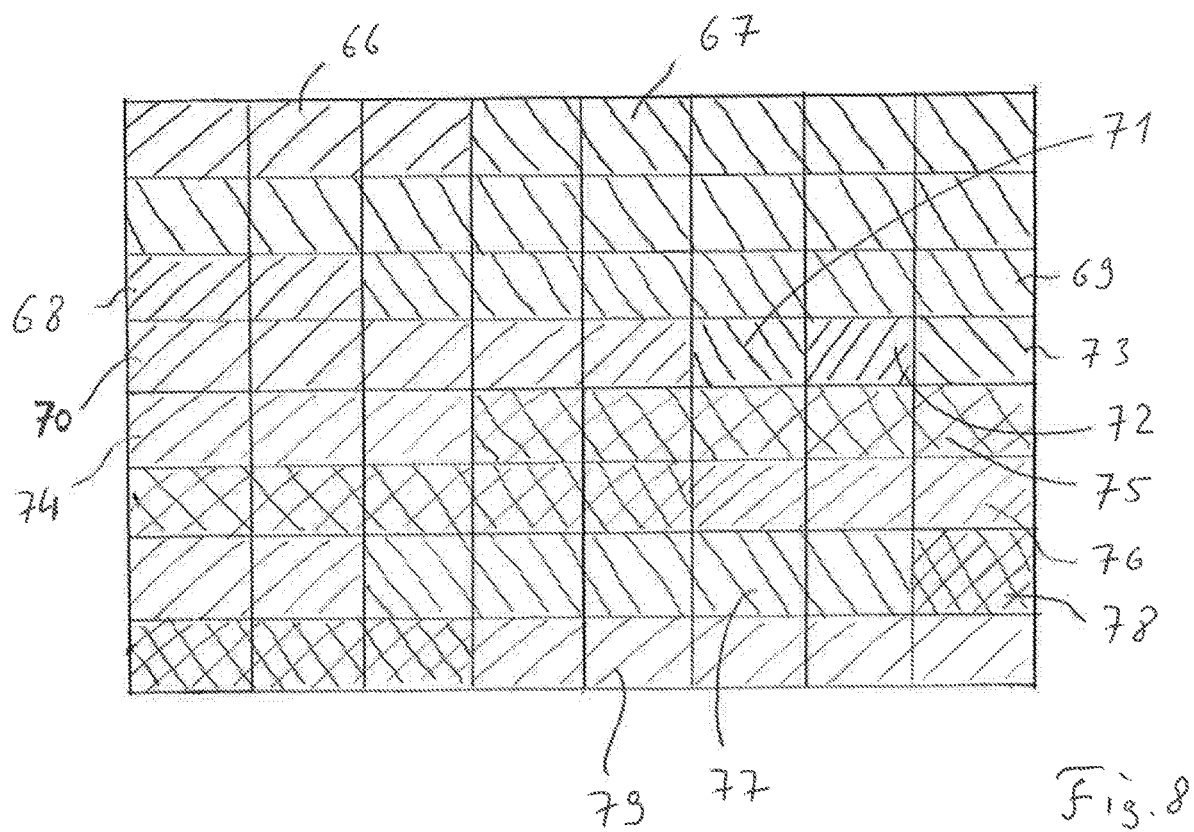
FIG. 8 shows the representation of a data packet if only the time to the next changeover (remaining green or red), but not the period length, is known.

FIG. 8 shows a possible representation of the digital contents of the message describing a signal system ahead, for which only the time to the next changeover (remaining green or red), but not the period length, is known. In accordance with the above-mentioned configuration of the CAN bus, such a message contains a bit pattern of 64 bits, the division of the bits being described below:

A unit 66 of 3 bits which designate the type of message (=5 here) is first of all transmitted. This is followed by a field 67 having a length of 13 bits for the offset. 2 bits 68 which designate the "cyclic count" (=1 here) are then transmitted. These are followed by the identity of the road (path index, 69) with a resolution of 6 bits. This is followed by the profile type (here: type 16) which is designated using 70 and has a length of 5 bits. The profile type is followed by a control bit 71, a bit 72 which designates repeated transmission, and a bit 73 which transmits an update status. These are followed by a field 74 which has a length of 3 bits and designates the current signal state (current color) and a field 75 which has a length of 10 bits and designates the minimum interval of time to the next signal change. These are followed by 5 bits 76 which designate the "Interval time to change" (=interval of time between the MinTimeToChange and the MaxTimeToChange). 77 is used to designate the following field which has a length of 5 bits and signifies the most likely interval of time to the next signal change. The following field 78 having a length of 4 bits designates the confidence level (confidence) attributed to the message. The last field 79 having a length of 5 bits finally designates the speed at which a "green wave" is reached. This can be provided by a traffic management system.

TABLE 1

| Head | | |
|---|---|---|
| MsgType | = 5 | |
| ProfileType | = 16 | |
| CyclicCount | = 1 | |
| Path index | ID of the path on which the stop line is located | |
| Offset | Position of the stop line as an offset with respect to the start of the path | |
| Payload | | |
| CurrentColor | 3 bits; | 0-7 for green, red, amber, flashing amber, red + green arrows to the right, red + green arrows to the left, dark (green) and not available |
| MinTimeToChange | 10 bits; | Resolution 0.1 sec.; 0-1021; 1022 for all larger values; 1023 for not available; the earliest time to the next changeover |
| IntvalTimeToChange | 5 bits; | Resolution 0.1 sec.; 0-29; 30 for all larger values; 31 for not available; the interval of time between the MinTimeToChange and the MaxTimeToChange |
| LikelyTimeToChange | 5 bits; | Resolution 0.1 sec.; 0-29; 30 for all larger values; 31 for not available; the estimated more accurate time in the interval |
| Confidence | 4 bits; | 0-15; for the likelihood of the LikelyTimeToChange; the value 15 means 100% |
| GreenWaveSpeed | 5 bits; | 0-30 m/sec corresponds to 0-108 km/h; 31 for not available, recommended speed in order to remain on the green wave. |

TABLE 2

| 1st message | | |
|---|---|---|
| Head | | |
| MessageType | = 5 | |
| ProfileType | = 17 | |
| CyclicCount | = 1 | |
| Pathindex | ID of the path on which the stop line is located | |
| Offset | Position of the stop line as an offset with respect to the start of the path | |
| Payload | | |
| ControlStatus | 1 bit; | 0 = fixed time; 1 = dynamic time |
| NextStartGreen | 17 bits; | Start of the next green phase as an absolute time mode 24, resolution 1 sec. |
| GreenPhase | 7 bits; | 0-12 sec.; duration of the green phase, 126 for values ≥ 126; 127 for not available |

TABLE 2-continued

| NoGreenPhase | 7 bits; | 0-125 sec.; duration of the non-green phase; 126 for values ≥ 126; 127 for not available |
|---|---|---|
| 2nd message | | |
| (generated only if the signal phases are not fixed) | | |
| Head | | |
| MessageType | = 5 | |
| ProfileType | = 18 | |
| CyclicCount | = 1 | |
| Path index | ID of the path on which the stop line is located | |
| Offset | Position of the end of the tailback* as an offset with respect to the start of the path | |
| Payload | | |
| SignalDirection | 4 bits; | (Optional additional text function) |
| MostLikelyStart | 7 bits; | Delta before NextStartGreen; resolution 0.1 sec.; |
| MostLikelyEnd | 7 bits; | Delta after NextStartGreen; resolution 0.1 sec.; |
| EarliestStart | 7 bits; | Delta before NextStartGreen; resolution 0.1 sec.; |
| LatestEnd | 7 bits; | Delta after NextStartGreen; resolution 0.1 sec.; |

*Only if an end of a tailback is estimated; otherwise, the position of the stop line is used. By definition, the tailback can be only so long that the start of the path or another stop line is reached.

The invention claimed is:

1. A driving assistance method in a vehicle, in which the movement of the vehicle in the direction of travel can be influenced on the basis of a traffic-controlling signal system which is in front of the vehicle on a road and has recurring signal states dynamically adapted to traffic, the method comprising:
   transmitting, from the traffic-controlling signal system, first data relating to a position of a stop line assigned to the signal system and second data specifying a plurality of start times and a plurality of end times of individual signal states of the signal system, wherein the second data includes an earliest possible time for a change to a signal state of the signal system and a latest possible time for a change from the signal state of the signal system, and the second data includes a most likely time of the change to the signal state of the signal system and a most likely time of the change from the signal state of the signal system;
   receiving, inside the vehicle by a first data processing system, and providing, by the first data processing system, the first data and the second data to electronic control devices in the form of data packets by means of a data connection inside the vehicle.

2. The method as claimed in claim 1, wherein at least one first data packet and one second data packet are provided by the first data processing system, the first data packet containing an item of information stating both that a second data packet connected to the first data packet is available and that the most likely time of the change to the signal state of the signal system and the most likely time of the change from the signal state of the signal system are dynamically adapted to a volume of traffic.

3. The method as claimed in claim 1, wherein the data packets are coded according to the ADASIS v2 standard.

4. The method as claimed in claim 1, wherein the data are transmitted inside the vehicle via a CAN bus.

\* \* \* \* \*